UNITED STATES PATENT OFFICE.

EDWARD H. PERDELWITZ, OF ANADARKO, OKLAHOMA.

PRESERVING MEAT.

1,259,439.  Specification of Letters Patent. Patented Mar. 12, 1918.

No Drawing. Application filed September 7, 1917. Serial No. 190,229.

*To all whom it may concern:*

Be it known that I, EDWARD H. PERDELWITZ, a citizen of the United States, and resident of Anadarko, in the county of Caddo and State of Oklahoma, have invented new and useful Improvements in Preserving Meats, of which the following is a specification.

My invention relates to improvements in preserving meats, and has for its object to provide a simple, effective, and inexpensive preparation, which may be readily applied to meat, whereupon the meat may be rendered immune to attacks by skippers, and other organisms, the characteristics of which are to subsist upon meats prepared especially as food products.

The different steps in the production of my preparation are as follows.

First, I take equal portions of black pepper, Mexican red pepper, ground cloves, ground mustard, and wheat flour which are placed in a suitable receptacle whereupon they are stirred by any suitable means sufficiently to form a thoroughly mixed composition.

Second, after having thoroughly mixed the above named constituents a sufficient quantity of water is added to the mixed composition to form a solution well saturated with the above mentioned constituents. After having added a sufficient amount of water to form a solution, sufficient heat is applied to the vessel, containing the solution, to cause the solution to reach a lukewarm temperature, care being taken not to allow the solution to become heated beyond its critical point. The heat is applied, not for the purpose of setting up any chemical reaction among the constituents used, but merely for the purpose of rendering the solution more capable of entering the pores of the meat which is to be treated. After having sufficiently heated the solution, the meat which is desired to be treated, is completely submerged in the solution, whereupon it is immediately removed therefrom and hung up to dry. In the drying of the meat, after its having been removed from the solution, the water is allowed to evaporate from the pores thereof, which pores have been penetrated by the solution, and the constituents of the solution are deposited within the pores slightly interior to the surface of the meat, due to the fact that the meat is permitted to remain only a few seconds in the solution and upon its being removed therefrom is allowed to dry before the solution has had an opportunity to enter far below the surface of the meat.

In reduction to practice, I have found that the various steps, necessary in the carrying of my process into effect, and referred to in the above description are the most effective, yet realizing that the conditions concurrent with the carrying of my process into use will necessarily vary, I desire to emphasize the fact that certain variations from the preciseness in the various steps which I have described may be executed, when necessary, without sacrificing any of the advantages of my invention as defined in the appended claim.

What I claim as my invention, and desire to secure by Letters Patent, is—

The process of treating meat consisting of submerging meat in a luke warm solution of water containing equal portions of black pepper, Mexican red pepper, ground cloves, ground mustard, allowing the meat to remain in the solution a sufficient length of time to permit the solution to slightly enter the pores of the meat, removing the meat from the solution, and then drying the meat to evaporate the water from the pores of the same, leaving equal portions of black pepper, Mexican red pepper, ground cloves, ground mustard contained in the original solution slightly embedded in the pores of the meat.

EDWARD H. PERDELWITZ.

Copies of this patent may be obtained for five cents each, by addressing the "Commissioner of Patents, Washington, D. C."